US012373576B2

(12) United States Patent
Korakin et al.

(10) Patent No.: US 12,373,576 B2
(45) Date of Patent: Jul. 29, 2025

(54) SCENARIO-BASED CYBER SECURITY SYSTEM AND METHOD

(71) Applicant: CYTWIST LTD., Ramat Gan (IL)

(72) Inventors: Yosef Korakin, Ramat Gan (IL); Yehonadav Hertz, Ramat Gan (IL); Orel Bitan, Ramat Gan (IL)

(73) Assignee: CYTWIST LTD., Ramat Gan (IL)

( * ) Notice: Subject to any disclaimer, the term of this patent is extended or adjusted under 35 U.S.C. 154(b) by 0 days.

(21) Appl. No.: 18/559,071

(22) PCT Filed: Feb. 10, 2022

(86) PCT No.: PCT/IL2022/050166
§ 371 (c)(1),
(2) Date: Nov. 6, 2023

(87) PCT Pub. No.: WO2022/238987
PCT Pub. Date: Nov. 17, 2022

(65) Prior Publication Data
US 2024/0232385 A1 Jul. 11, 2024

Related U.S. Application Data

(60) Provisional application No. 63/186,126, filed on May 9, 2021.

(51) Int. Cl.
*G06F 21/57* (2013.01)
(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS 9,654,485 B1 5/2017 Neumann
10,033,748 B1 7/2018 Cunningham et al.
(Continued)

FOREIGN PATENT DOCUMENTS

WO 2016177156 A1 11/2016

*Primary Examiner* — Darshan I Dhruv
(74) *Attorney, Agent, or Firm* — S.J. Intellectual Property LTD.

(57) ABSTRACT

A system comprising a processing circuitry configured to: obtain information of one or more cyber-attack scenarios, each (i) associated with a sequence of events, and (ii) posing a threat on one or more computerized systems of an organization; for each of the cyber-attack scenarios: (a) collect preliminary information enabling determination of occurrence of a first sub-group of the sequence associated with the cyber-attack scenario; (b) analyze the preliminary information to identify the occurrence of the first sub-group; (c) upon identification of occurrence of the first sub-group, proactively collect complementary information; (d) analyze the complementary information to identify the occurrence of the second sub-group, or attempt to negate occurrence of the cyber-attack scenario; and (e) upon the analysis of the complementary information resulting in identification of occurrence of the second sub-group of the respective events, trigger an alert indicative of a potential occurrence of the cyber-attack scenario.

18 Claims, 3 Drawing Sheets

(56) References Cited

U.S. PATENT DOCUMENTS

| | | |
|---|---|---|
| 10,454,950 B1 | 10/2019 | Aziz |
| 10,462,173 B1 | 10/2019 | Aziz et al. |
| 10,691,796 B1* | 6/2020 | Stolte ................. G06Q 10/0635 |
| 2011/0320815 A1 | 12/2011 | Yao et al. |
| 2011/0320816 A1* | 12/2011 | Yao .......................... G06F 21/32 |
| | | 713/176 |
| 2013/0227697 A1* | 8/2013 | Zandani .................. G06F 21/57 |
| | | 726/25 |
| 2014/0344926 A1 | 11/2014 | Cunningham et al. |
| 2016/0050225 A1* | 2/2016 | Carpenter ............. G06F 21/577 |
| | | 726/25 |
| 2016/0164893 A1 | 6/2016 | Levi |
| 2016/0307286 A1* | 10/2016 | Miasnik ................ H04W 4/029 |
| 2016/0359895 A1* | 12/2016 | Chiu ................... H04L 63/1433 |
| 2017/0063917 A1 | 3/2017 | Chesla |
| 2018/0234435 A1 | 8/2018 | Cohen et al. |
| 2018/0288077 A1* | 10/2018 | Siddiqui ............. H04L 63/1416 |
| 2018/0351980 A1 | 12/2018 | Galula et al. |
| 2019/0141058 A1 | 5/2019 | Hassanzadeh et al. |
| 2020/0014713 A1 | 1/2020 | Paul et al. |
| 2020/0351298 A1* | 11/2020 | Paturi ...................... G06F 21/54 |
| 2021/0092162 A1* | 3/2021 | Crabtree ............... H04L 63/145 |
| 2021/0406365 A1* | 12/2021 | Neil ...................... G06F 16/951 |

\* cited by examiner

SCENARIO-BASED CYBER SECURITY SYSTEM AND METHOD

TECHNICAL FIELD

The invention relates to a scenario-based cyber security system and method.

BACKGROUND

Current cyber security systems operate by following a "bottom-up" scheme-they collect vast amounts of data relating to a pre-determined list of monitored events occurring on devices, network elements or any other endpoints of an organization. The current cyber security systems monitor these pre-defined events, and upon one or more of the monitored events meeting certain rules—the events are reported to a central system for correlation analysis and in case some correlation criteria have been meet, for performing a response. In order to identify cyber-attacks, all events that can be related to an attack are collected and analyzed by these cyber security systems. This approach of collecting all indications from the endpoints (from the "bottom") and moving them to the cyber security system for analysis (to the "up") requires a large amount of organizational computation resources and results with false positive alerts.

There is thus a need in the art for a new "top-down" approach to cyber security systems—a scenario-based cyber security system and method.

References considered to be relevant as background to the presently disclosed subject matter are listed below. Acknowledgement of the references herein is not to be inferred as meaning that these are in any way relevant to the patentability of the presently disclosed subject matter.

US Patent application No. 2020/0014713 (Paul et al.) published on Jan. 9, 2020, discloses a network management device generates a first script defining a first function for detecting a first customizable network event in a sequence of customizable network events indicative of a security threat to a network. The network management device activates the first script at a first network device in the network so as to cause the first network device to execute the first function for detecting the first customizable network event, and obtains, from the first network device, one or more indications that the first network device has detected the first customizable network event. Based on the one or more indications, the network management device determines whether to activate a second script defining a second function for detecting a second customizable network event in the sequence at a second network device in the network capable of detecting the second customizable network event.

US Patent application No. 2019/0141058 (Hassanzadeh et al.) published on May 9, 2019, discloses methods for detecting and identifying advanced persistent threats (APTs) in networks, including receiving first domain activity data from a first network domain and second domain activity data from a second network domain, including multiple alerts from the respective first and second network domains and where each alert of the multiple alerts results from one or more detected events in the respective first or second network domains. A classification determined for each alert of the multiple alerts with respect to a cyber kill chain. A dependency is then determined for each of one or more pairs of alerts and a graphical visualization of the multiple alerts is generated, where the graphical visualization includes multiple nodes and edges between the nodes, each node corresponding to the cyber kill chain and representing at least one alert, and each edge representing a dependency between alerts.

U.S. Pat. No. 10,033,748 (Cunningham et al.) published on Jul. 24, 2018, discloses a system and method to detect and contain threatening executable code by employing a threat monitor, verifier, endpoint agent, and a security information and event management module. The system and method determine whether a threat has persisted or executed, and allow that information to be communicated back to the detection mechanism (or other system) such that a user (or machine) may make a decision to take further action such as to contain the threat quickly and/or permit the system to do so automatically. The system further generates a report by a threat monitor, the report includes information on the one or more threats resulting from the analyzing of the portion of the network data; analyzing the information within the report by a verifier to yield intelligence that includes at least one of instructions or indicators related to the identified one or more threats and determining, gathering and correlating verification information from the endpoint agent to determine whether the verification information corresponds to a verified threat, the verification information includes at least a portion of the results of the examination and an identifier for the endpoint device; and sending a notification including a portion of the verification information to identify the verified threat.

US Patent application No. 2014/0344926 (Cunningham et al.) published on Nov. 20, 2014, discloses a system and method to detect and contain threatening executable code by employing a threat monitor, verifier, endpoint agent, and a security information and event management module.

U.S. Pat. No. 10,462,173 (Aziz et al.) published on Oct. 29, 2019, discloses techniques to determine and verify maliciousness of an object are described. An endpoint device, during normal processing of an object, identifies the object as suspicious in response to detected features of the object and coordinates further analysis with a malware detection system. The malware detection system processes the object, collects features related to processing, and analyzes the features of the suspicious object to classify as malicious or benign. Correlation of the features captured by the endpoint device and the malware detection system may verify a classification by the malware detection system of maliciousness of the content. The malware detection system may communicate with the one or more endpoint devices to influence detection and reporting of behaviors by those device(s).

US Patent application No. 2017/0063917 (CHESLA) published on Mar. 2, 2017, discloses a method and system for cyber threat risk-chain generation are provided. The method includes obtaining a plurality of events; mapping each event of the plurality of obtained events to a global threat type, wherein each global threat type is associated with a risk-chain group; correlating among the mapped plurality of events to determine at least a transition between one global threat type to another; and updating a data structure maintaining data of at least one risk-chain, when the transition is determined, wherein the at least one risk-chain is a lifecycle of a cyber-attack.

US Patent application No. 2018/0234435 (COHEN et al.) published on Aug. 16, 2018, discloses a cyber-security system and method for proactively predicting cyber-security threats are provided. The method comprises receiving a plurality of security events classified to different groups of events; correlating the plurality of received security events to classify potential cyber-security threats to a set of correlation types; determining a correlation score for each classified potential cyber-security threat; and determining a prediction score for each classified potential cyber-security threat, wherein the prediction score is determined based in part on the correlation score.

U.S. Pat. No. 9,654,485 (Neumann) published on May 16, 2017, discloses an analytics-based security monitoring system includes instructions that may be executed by a computing system to receive data in the form of event logs from one or more network devices transferred through a computing environment, detect a plurality of behavioral characteristics from the received event logs, identify behavioral fragments composed of related behavioral characteristics, and identify an attack by correlating the behavioral fragments against patterns of known malicious attacks. The analytics-based security monitoring system may then perform a learning process to enhance further detection of attacks and perform one or more remedial actions when an attack is identified.

US Patent application No. 2018/0351980 (GALULA et al.) published on Dec. 6, 2018, discloses a system and method for providing fleet cyber-security comprising may include collecting, by a plurality of data collection units installed in a respective plurality of vehicles in the fleet, information related to cyber security and including the information in reports to a server. Data in reports may be aggregated, by the server. A cyber-attack may be identified based on aggregated data.

U.S. Pat. No. 10,454,950 (Aziz) published on Oct. 22, 2019, discloses a centralized aggregation technique detects lateral movement of a stealthy (i.e., covert) cyber-attack in an enterprise network. A data center security (DCS) appliance may be located at a data center of the enterprise network, while a malware detection system (MDS) appliance may be located at a periphery of the network, an endpoint may be internally located within the enterprise network and an attack analyzer may be centrally located in the network. The appliances and endpoint may provide results of heuristics to an attack analyzer, wherein the heuristic results may be used to detect one or more tools downloaded to the endpoint, as well as resulting actions of the endpoint to determine whether the tools and actions manifest observable behaviors of the lateral movement of the SC-attack. The observable behaviors may include (i) unauthorized use of legitimate credentials obtained at the endpoint, as well as (ii) unusual access patterns via actions originated at the endpoint to acquire sensitive information stored on one or more servers on the network. The attack analyzer may then collect and analyze information related to the observable behaviors provided by the appliances and endpoint to create a holistic view of the lateral movement of the SC-attack.

GENERAL DESCRIPTION

In accordance with a first aspect of the presently disclosed subject matter, there is provided a cyber security system comprising a processing circuitry configured to: obtain information of one or more cyber-attack scenarios, each (i) associated with a sequence of a plurality of events, and (ii) posing a threat on one or more computerized systems of an organization; for each given cyber-attack scenario of the cyber-attack scenarios: (a) collect preliminary information enabling determination of occurrence of a first sub-group of the sequence associated with the given cyber-attack scenario; (b) analyze the preliminary information to identify the occurrence of the first sub-group; (c) upon identification of occurrence of the first sub-group of the respective events, proactively collect complementary information, enabling at least one of: (i) determination of occurrence of a second sub-group of the sequence associated with the given cyber-attack scenario, the second sub-group including at least one of the events of the sequence associated with the given cyber-attack scenario that is not included in the first sub-group, or (ii) determining that the given cyber-attack scenario is not occurring; (d) analyze the complementary information to perform at least one of: (i) identify the occurrence of the second sub-group, or (ii) attempt to negate occurrence of the given cyber-attack scenario; and (e) upon the analysis of the complementary information resulting in identification of occurrence of the second sub-group of the respective events and not in negation of the occurrence of the given cyber-attack scenario, trigger an alert indicative of a potential occurrence of the given cyber-attack scenario.

In some cases, the processing circuitry is further configured to: proactively collect additional complementary information, after triggering the alert; analyze the additional complementary information to re-attempt to negate occurrence of the given cyber-attack scenario; and upon the analysis of the complementary information resulting in negation of the occurrence of the given cyber-attack scenario, cancel the alert.

In some cases, the processing circuitry is an endpoint processing circuitry of an endpoint of the organization, and wherein the preliminary information and the complementary information are collected from the endpoint.

In some cases, the processing circuitry is a central server processing circuitry of a server of the organization, and wherein the preliminary information and the complementary information are collected from a plurality of endpoints of the organization.

In some cases, the server is a virtual server running in a cloud computing environment.

In some cases, the preliminary information is received from one or more endpoints of the organization.

In some cases, the processing circuitry is a central server processing circuitry of a server of the organization, and wherein the preliminary information and the complementary information are collected from a Security Information and Event Management (SIEM) system of the organization.

In some cases, the events include one or more of: creation of a first file, creation of a first process, deletion of a second file, termination of a second process, change of a first name of a third file, change of a second name of a third process, loading of a driver, loading of a Dynamic Link Library (DLL), accessing a disk, opening a network connection.

In some cases, at least some of the preliminary information is collected from log files.

In some cases, the complementary information is collected by performing one or more of: (a) actively scanning a memory of one or more endpoints of the organization; (b) actively retrieving information from a registry of one or more of the endpoints of the organization; or (c) actively scanning a Master File Table (MFT) of one or more endpoints of the organization.

In accordance with a second aspect of the presently disclosed subject matter, there is provided a method comprising: obtaining, by a processing circuitry, information of one or more cyber-attack scenarios, each (i) associated with a sequence of a plurality of events, and (ii) posing a threat on one or more computerized systems of an organization; for each given cyber-attack scenario of the cyber-attack scenarios: (a) collecting, by the processing circuitry, preliminary information enabling determination of occurrence of a first sub-group of the sequence associated with the given cyber-attack scenario; (b) analyzing, by the processing circuitry, the preliminary information to identify the occurrence of the first sub-group; (c) upon identification of occurrence of the first sub-group of the respective events, proactively collecting, by the processing circuitry, complementary information, enabling at least one of: (i) determination of occurrence of a second sub-group of the sequence associated with the given cyber-attack scenario, the second sub-group including at least one of the events of the sequence associated with the given cyber-attack scenario that is not included in the first sub-group, or (ii) determining that the given cyber-attack scenario is not occurring; (d) analyzing, by the processing circuitry, the complementary information to perform at least one of: (i) identify the occurrence of the second sub-group, or (ii) attempt to negate occurrence of the given cyber-attack scenario; and (e) upon the analysis of the complementary information resulting in identification of occurrence of the second sub-group of the respective events and not in negation of the occurrence of the given cyber-attack scenario, triggering, by the processing circuitry, an alert indicative of a potential occurrence of the given cyber-attack scenario.

In some cases, the method further comprising: proactively collecting, by the processing circuitry, additional complementary information, after triggering the alert; analyzing, by the processing circuitry, the additional complementary information to re-attempt to negate occurrence of the given cyber-attack scenario; and upon the analysis of the complementary information resulting in negation of the occurrence of the given cyber-attack scenario, canceling, by the processing circuitry, the alert.

In some cases, the processing circuitry is an endpoint processing circuitry of an endpoint of the organization, and wherein the preliminary information and the complementary information are collected from the endpoint.

In some cases, the processing circuitry is a central server processing circuitry of a server of the organization, and wherein the preliminary information and the complementary information are collected from a plurality of endpoints of the organization.

In some cases, the server is a virtual server running in a cloud computing environment.

In some cases, the preliminary information is received from one or more endpoints of the organization.

In some cases, the processing circuitry is a central server processing circuitry of a server of the organization, and wherein the preliminary information and the complementary information are collected from a Security Information and Event Management (SIEM) system of the organization.

In some cases, the events include one or more of: creation of a first file, creation of a first process, deletion of a second file, termination of a second process, change of a first name of a third file, change of a second name of a third process, loading of a driver, loading of a Dynamic Link Library (DLL), accessing a disk, opening a network connection.

In some cases, at least some of the preliminary information is collected from log files.

In some cases, the complementary information is collected by performing one or more of: (a) actively scanning a memory of one or more endpoints of the organization; (b) actively retrieving information from a registry of one or more of the endpoints of the organization; or (c) actively scanning a Master File Table (MFT) of one or more endpoints of the organization.

In accordance with a third aspect of the presently disclosed subject matter, there is provided a non-transitory computer readable storage medium having computer readable program code embodied therewith, the computer readable program code, executable by at least one processor of a computer to perform a method comprising: obtaining, by a processing circuitry, information of one or more cyber-attack scenarios, each (i) associated with a sequence of a plurality of events, and (ii) posing a threat on one or more computerized systems of an organization; for each given cyber-attack scenario of the cyber-attack scenarios: (a) collecting, by the processing circuitry, preliminary information enabling determination of occurrence of a first sub-group of the sequence associated with the given cyber-attack scenario; (b) analyzing, by the processing circuitry, the preliminary information to identify the occurrence of the first sub-group; (c) upon identification of occurrence of the first sub-group of the respective events, proactively collecting, by the processing circuitry, complementary information, enabling at least one of: (i) determination of occurrence of a second sub-group of the sequence associated with the given cyber-attack scenario, the second sub-group including at least one of the events of the sequence associated with the given cyber-attack scenario that is not included in the first sub-group, or (ii) determining that the given cyber-attack scenario is not occurring; (d) analyzing, by the processing circuitry, the complementary information to perform at least one of: (i) identify the occurrence of the second sub-group, or (ii) attempt to negate occurrence of the given cyber-attack scenario; and (e) upon the analysis of the complementary information resulting in identification of occurrence of the second sub-group of the respective events and not in negation of the occurrence of the given cyber-attack scenario, triggering, by the processing circuitry, an alert indicative of a potential occurrence of the given cyber-attack scenario.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "collecting", "analyzing", "triggering", "negating", "canceling" or the like, include action and/or processes of a computer that manipulate and/or transform data into other data, said data represented as physical quantities, e.g. such as electronic quantities, and/or said data representing the physical objects. The terms "computer", "processor", "processing resource" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
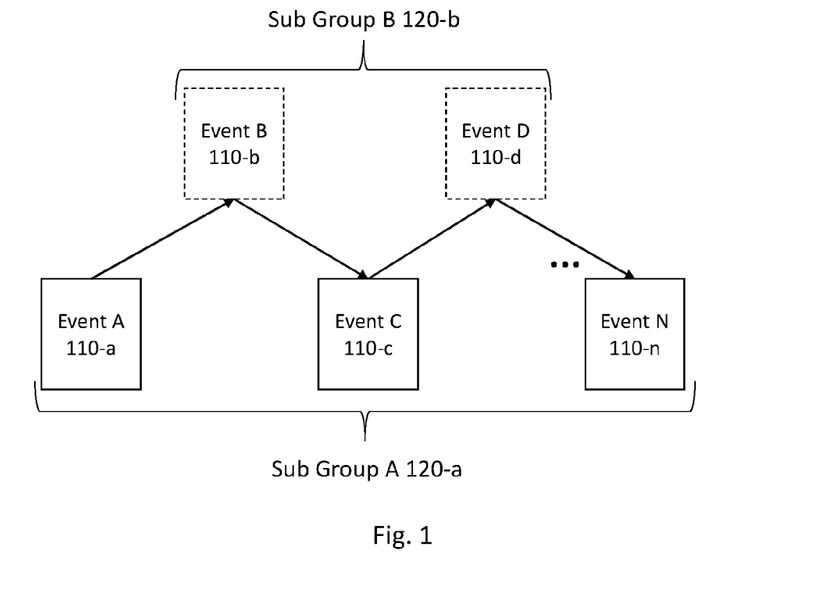
FIG. 1 is a schematic illustration of an example cyber-attack scenario, in accordance with the presently disclosed subject matter.
Figure 2:
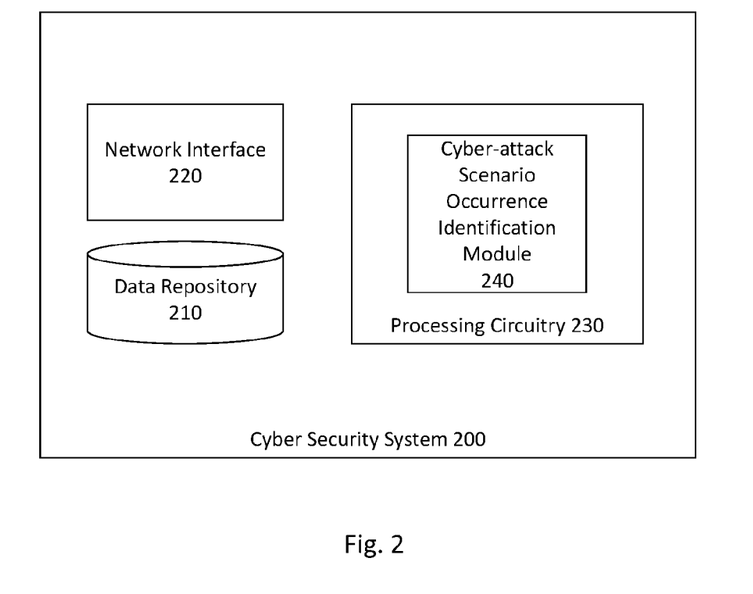
FIG. 2 is a block diagram schematically illustrating one example of a scenario-based cyber security system, in accordance with the presently disclosed subject matter.
Figure 3:
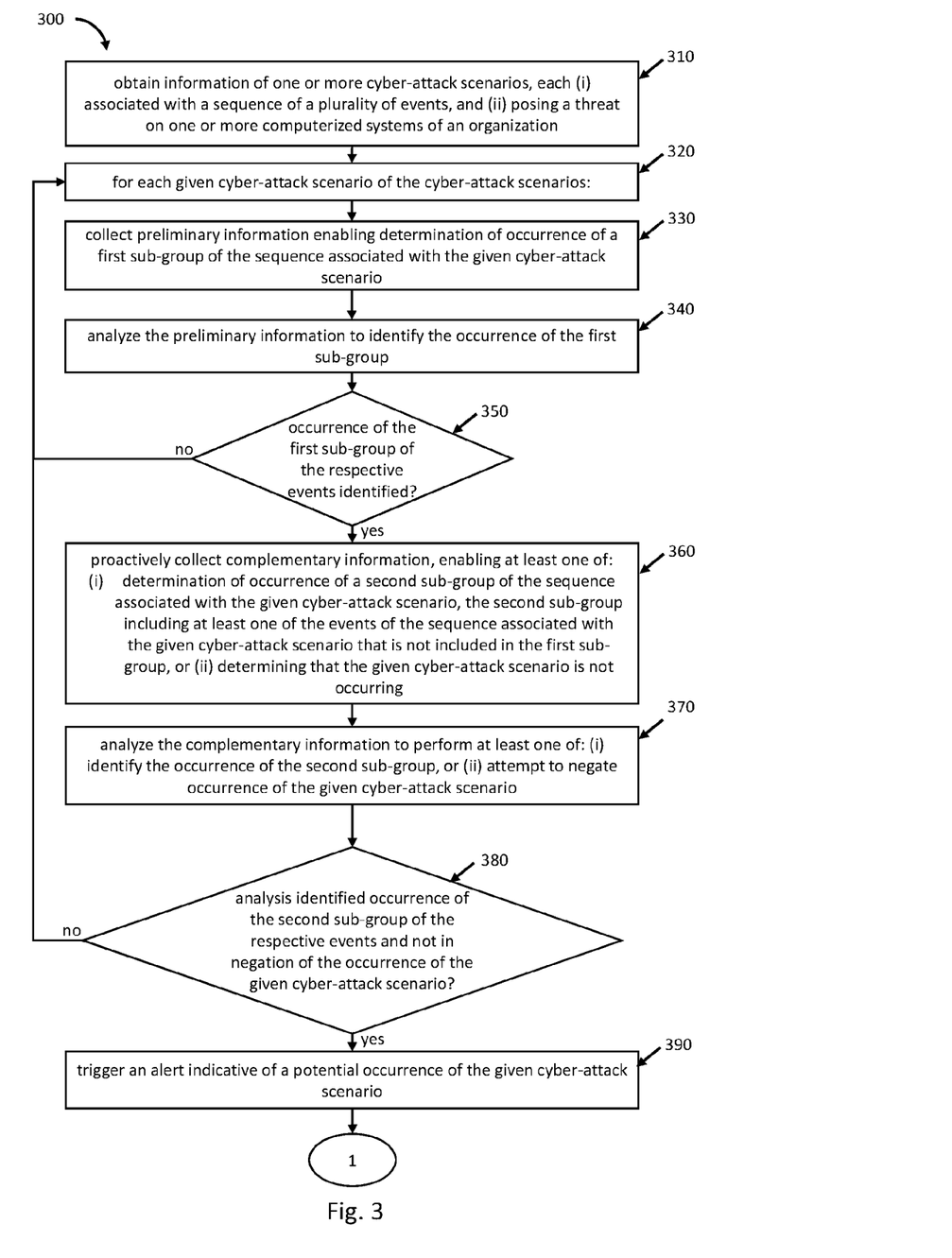
FIG. 3 is a flowchart illustrating one example of a sequence of operations carried out for cyber-attack scenario occurrence identification, in accordance with the presently disclosed subject matter.
Figure 4:
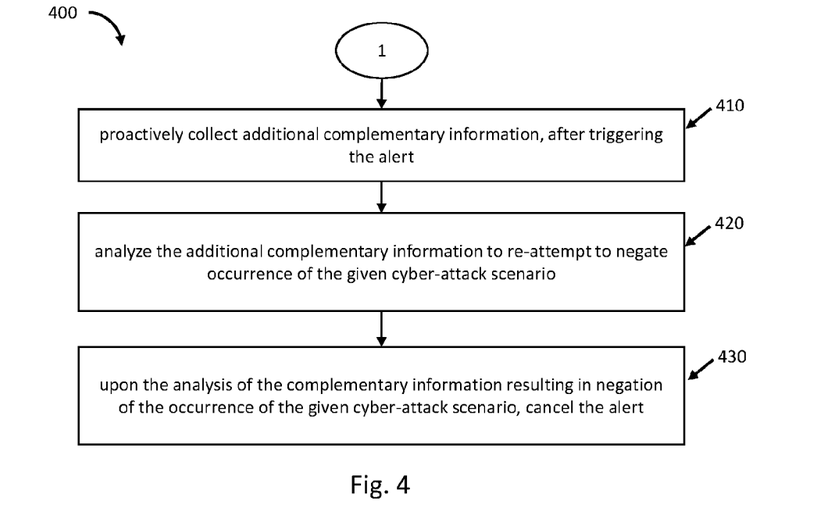
FIG. 4 is a flowchart illustrating one example of a sequence of operations carried out for negating an occurrence of a cyber-attack scenario, in accordance with the presently disclosed subject matter.

In embodiments of the presently disclosed subject matter, fewer, more and/or different stages than those shown in FIGS. 3-4 may be executed. In embodiments of the presently disclosed subject matter one or more stages illustrated in FIGS. 3-4 may be executed in a different order and/or one or more groups of stages may be executed simultaneously. FIGS. 1-2 illustrate a general schematic of the system architecture in accordance with an embodiment of the presently disclosed subject matter. Each module in FIGS. 1-2 can be made up of any combination of software, hardware and/or firmware that performs the functions as defined and explained herein. The modules in FIGS. 1-2 may be centralized in one location or dispersed over more than one location. In other embodiments of the presently disclosed subject matter, the system may comprise fewer, more, and/or different modules than those shown in FIGS. 1-2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a schematic illustration of an example cyber-attack scenario, in accordance with the presently disclosed subject matter.

A cyber-attack scenario is associated with a sequence of a plurality of events (e.g. event A 110-*a*, event B 110-*b*, event C 110-*c*, event D 110-*d*, . . . , event N 110-*n*). Each event (e.g. event A 110-*a*, event B 110-*b*, event C 110-*c*, event D 110-*d*, . . . , event N 110-*n*) is an occurrence on an asset of an organization. An asset can be: computerized devices (such as: endpoint computers, smart mobile devices, servers, etc.), network elements (such as: firewalls, routers, switches, etc.), physical assets (such as: human workers of the organization, visitors to the organization, rooms, doors, air-conditioning systems, etc.) or any other asset of the organization. The cyber-attack scenario is posing a threat on one or more computerized systems of the organization. A non-limiting example can be an attacker gaining access to sensitive information stored on a server of the organization by running the series of events (e.g. event A 110-*a*, event B 110-*b*, event C 110-*c*, event D 110-*d*, . . . , event N 110-*n*) giving the attacker access privileges to the sensitive information. The events (e.g. event A 110-*a*, event B 110-*b*, event C 110-*c*, event D 110-*d*, . . . , event N 110-*n*) can be legitimate occurrences on the assets (such as: installation of drivers, execution of known software programs, changes of registry values, etc.). The occurrence of the series of events (e.g. event A 110-*a*, event B 110-*b*, event C 110-*c*, event D 110-*d*, . . . , event N 110-*n*) is the indication of an attack on the organization. In the non-limiting example of the attacker gaining access to sensitive information stored on a given server of the organization, the events (e.g. event A 110-*a*, event B 110-*b*, event C 110-*c*, event D 110-*d*, . . . , event N 110-*n*) can be for example: (a) running a legitimate command-line program on the given server to gain access to the registry of the given endpoint, (b) executing a registry control program to change registry values in the registry of the given server, and (c) adding a new value in the registry of the given endpoint in order for the attacker to gain control over the given server and access the sensitive information.

The cyber-attack scenario can be comprised of sub groups (e.g. sub group A 120-*a*, sub group B 120-*b*). Each sub group comprises one or more events (e.g. event A 110-*a*, event B 110-*b*, event C 110-*c*, event D 110-*d*, . . . , event N 110-*n*). Continuing the above non-limiting example, sub group A 120-*a* can comprise events (a) and (c) above and sub group B 120-*b* can comprise event (b) above.

A scenario-based cyber security system applies a "top-down" approach to cyber security. The cyber security system that is scenario-based can monitor for the occurrence of less events (e.g. event A 110-*a*, event B 110-*b*, event C 110-*c*, event D 110-*d*, . . . , event N 110-*n*)—only the events that are part of sub group A 120-*a*. The cyber security system can pro-actively find information to support or negate the occurrence of the events (e.g. event A 110-*a*, event B 110-*b*, event C 110-*c*, event D 110-*d*, . . . , event N 110-*n*) of the second sub group B 120-*b*, as further detailed herein, inter alia with reference to FIG. 3.

This cyber security system is more efficient than current cyber security systems as it requires monitoring of fewer events and results in less false positive alerts.

Having briefly described a cyber-attack scenario, attention is drawn to FIG. 2, a block diagram schematically illustrating one example of a scenario-based cyber security system, in accordance with the presently disclosed subject matter.

According to certain examples of the presently disclosed subject matter, a cyber security system 200 comprises a network interface 220 enabling connecting the cyber security system 200 to an organizational network and enabling it to send and receive data sent thereto through the organizational network, including in some cases receiving information collected from computerized endpoints of the organizational network. In some cases, the network interface 220 can be connected to the Internet.

Cyber security system 200 can further comprise or be otherwise associated with a data repository 210 (e.g. a database, a storage system, a memory including Read Only Memory—ROM, Random Access Memory—RAM, or any other type of memory, etc.) configured to store data, including, inter alia, cyber-attack scenarios, sequence of a plurality of events (e.g. event A 110-*a*, event B 110-*b*, event C 110-*c*, event D 110-*d*, . . . , event N 110-*n*) associated with cyber-attack scenarios, information enabling determination of occurrence of a sub-group (such as: sub group A 120-*a*, sub group B 120-*b*) of the sequence of events (event A 110-*a*, event B 110-*b*, event C 110-*c*, event D 110-*d*, . . . , event N 110-*n*) associated with the cyber-attack scenarios, etc. In some cases, data repository 210 can be further configured to enable retrieval and/or update and/or deletion of the data stored thereon. It is to be noted that in some cases, data repository 210 can be distributed. It is to be noted that in some cases, data repository 210 can be stored in on cloud-based storage.

Cyber security system 200 further comprises processing circuitry 230. Processing circuitry 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant organizational cyber security system 200 resources and for enabling operations related to organizational cyber security system 200 resources.

The processing circuitry 230 comprises a cyber-attack scenario occurrence identification module 240.

Cyber-attack scenario occurrence identification module 240 can be configured to perform a cyber-attack scenario occurrence identification process, as further detailed herein, inter alia with reference to FIG. 3.

Cyber-attack scenario occurrence identification module 240 can be further configured to perform a process for negating an occurrence of a cyber-attack scenario, as further detailed herein, inter alia with reference to FIG. 4.

Turning to FIG. 3, there is shown a flowchart illustrating one example of a sequence of operations carried out for cyber-attack scenario occurrence identification, in accordance with the presently disclosed subject matter.

According to certain examples of the presently disclosed subject matter, cyber security system 200 can be configured to perform a cyber-attack scenario occurrence identification process 300, e.g. utilizing the cyber-attack scenario occurrence identification module 240.

For this purpose, cyber security system 200 can be configured to obtain information of one or more cyber-attack scenarios, each (i) associated with a sequence of a plurality of events (e.g. event A 110-*a*, event B 110-*b*, event C 110-*c*, event D 110-*d*, . . . , event N 110-*n*), and (ii) posing a threat on one or more computerized systems of an organization (block 310). The information of one or more cyber-attack scenarios can be obtained by the cyber security system 200 from various sources: cyber-attack simulators, research of cyber-attack scenarios executed on the organization or on other organizations, cyber-attack scenarios knowledge bases or any other known cyber-attack scenarios. In some cases, the cyber security system 200 identifies new cyber-attack scenarios automatically as part of its operation within the organization.

The sequence of a plurality of events (e.g. event A 110-*a*, event B 110-*b*, event C 110-*c*, event D 110-*d*, . . . , event N 110-*n*) associated with the cyber-attack scenario can include any event (e.g. event A 110-*a*, event B 110-*b*, event C 110-*c*, event D 110-*d*, . . . , event N 110-*n*) that can occur on any computerized asset of the organization. Example events (e.g. event A 110-*a*, event B 110-*b*, event C 110-*c*, event D 110-*d*, . . . , event N 110-*n*) can include: creation of a file on the endpoint, creation of a process—for example creation of a log process with full command line permissions for the current and parent process, deletion of a file, termination of a process, change of a name of a file on a device, change of a name of a process, loading of a driver, loading of a Dynamic Link Library (DLL), accessing a disk, opening of a network connection, changes to values of a registry, or any other event (e.g. event A 110-*a*, event B 110-*b*, event C 110-*c*, event D 110-*d*, . . . , event N 110-*n*) occurring on an asset of the organization. The event (e.g. event A 110-*a*, event B 110-*b*, event C 110-*c*, event D 110-*d*, . . . , event N 110-*n*) can include parameters associated with the event, for example the event (e.g. event A 110-*a*, event B 110-*b*, event C 110-*c*, event D 110-*d*, . . . , event N 110-*n*) of process creation can include a parameter of the hash of the process image files. Another example of a parameter can be the signatures and hashes of loaded DLL as part of the loading of a DLL event (e.g. event A 110-*a*, event B 110-*b*, event C 110-*c*, event D 110-*d*, . . . , event N 110-*n*). An additional example of event parameters can be the type of access of accessing a disk event. Event parameters can also include source process, IP addresses, port numbers, hostnames and port names for the network connection event (e.g. event A 110-*a*, event B 110-*b*, event C 110-*c*, event D 110-*d*, event N 110-*n*). Another example of parameters an include the registry value changed for the changes to values of a registry event (e.g. event A 110-*a*, event B 110-*b*, event C 110-*c*, event D 110-*d*, . . . , event N 110-*n*).

A non-limiting example of a cyber-attack scenario can be an "execute cyber-attack scenario" associated with the following sequence of events (e.g. event A 110-*a*, event B 110-*b*, event C 110-*c*, event D 110-*d*, . . . , event N 110-*n*):
(a) using a legitimate command-line program on a given endpoint (for example: the Microsoft Connection Manager Profile Installer (CMSTP.exe) command-line program) to execute a network driver installation command, (b) running a registry control program (for example: Regsvr32.exe) to change registry values in the registry of the given endpoint, and (c) adding a new value in the registry of the given endpoint in order for the attacker to gain control over the given endpoint.

It is to be noted that in some cases, the cyber security system 200 can be an Endpoint Detection and Response (EDR) system monitoring endpoints of an organization that can be connected through an organizational network, a Security Information and Events Management (SIEM) system, or any other cyber security system. The endpoints monitored can be devices, firewalls, servers or any other asset of the organization. In some cases, cyber security system 200 performs the entire cyber-attack scenario occurrence identification process 300 on a given endpoint of the organization. In other cases, the cyber-attack scenario occurrence identification process 300 can collect information from one or more endpoints of the organization and process the information in a central location or in a distributed manner or on a cloud server or in any other manner.

After obtaining the information, the cyber security system 200 can be further configured to perform the following steps (described herein in blocks 330-390) for each given cyber-attack scenario of the obtained cyber-attack scenarios (block 320). In our non-limiting example, the given cyber-attack scenario can be the "execute cyber-attack scenario" described above.

The cyber security system 200 collects preliminary information enabling determination of occurrence of a first sub-group of the sequence associated with the given cyber-attack scenario (block 330). In some cases, at least some of the preliminary information can be collected from log files. These log files can be on one or more endpoints of the organization.

Continuing the non-limiting example of the "execute cyber-attack scenario", the preliminary information can include execution of processes, changes of registry values and additional events (e.g. event A 110-*a*, event B 110-*b*, event C 110-*c*, event D 110-*d*, . . . , event N 110-*n*) and their associated parameters.

After collecting the preliminary information, the cyber security system 200 can be further configured to analyze the preliminary information to identify the occurrence of the first sub-group (block 340).

In some cases, the analysis of the preliminary information can be based on a pre-defined rule set. In some cases, the rule set is defined by experts. In some cases, the rule set is automatically defined by cyber security system 200. In some cases, the analysis is based on machine-learning.

In the non-limiting example of the "execute cyber-attack scenario" the preliminary information can be analyzed to identify the occurrence of events (a) and (c) of the "execute cyber-attack scenario". These events form the first sub-group in our example.

The cyber security system 200 can be further configured to identify the occurrence of the first sub-group A 120-*a* of the respective events (e.g. event A 110-*a*, event B 110-*b*, event C 110-*c*, event D 110-*d*, . . . , event N 110-*n*). If occurrence of the first sub-group A 120-*a* of the respective events (e.g. event A 110-*a*, event B 110-*b*, event C 110-*c*, event D 110-*d*, . . . , event N 110-*n*) is identified then continue to block 360. In case the occurrence of the first sub-group A 120-*a* of the respective events (e.g. event A 110-*a*, event B 110-*b*, event C 110-*c*, event D 110-*d*, . . . , event N 110-*n*) not identified return to block 320 and continue the process for the next cyber-attack scenario of the obtained cyber-attack scenarios, if any (block 350).

In our non-limiting example, the occurrence of events (a) and (b) has been identified and we continue on with the process in block 360.

The cyber security system 200 can be further configured to proactively collect complementary information, enabling at least one of: (i) determination of occurrence of a second sub-group B 120-*b* of the sequence associated with the given cyber-attack scenario, the second sub-group B 120-*b* including at least one of the events (e.g. event A 110-*a*, event B 110-*b*, event C 110-*c*, event D 110-*d*, . . . , event N 110-*n*) of the sequence associated with the given cyber-attack scenario that is not included in the first sub-group, or (ii) determining that the given cyber-attack scenario is not occurring (block 360).

In some cases, the complementary information is collected by performing one or more of: (a) actively scanning a memory of one or more endpoints of the organization; (b) actively retrieving information from a registry of one or more of the endpoints of the organization; or (c) actively scanning a Master File Table (MFT) of one or more endpoints of the organization.

In the non-limiting example, the complementary information collected can include information indicative if the registry control program has been executed.

After collecting the complementary information, cyber security system 200 can be further configured to analyze the complementary information to perform at least one of: (i) identify the occurrence of the second sub-group B 120-*b*, or (ii) attempt to negate occurrence of the given cyber-attack scenario (block 370).

In some cases, the analysis of the complementary information can be based on a pre-defined rule set. In some cases, the rule set is defined by experts. In some cases, the rule set is automatically defined by cyber security system 200. In some cases, the analysis is based on machine-learning.

In continuation of the non-limiting example above, the complementary information is collected in order to either identify the occurrence of event (b) of the "execute cyber-attack scenario" (the running a registry control program), which is the second sub-group or to negate the occurrence of the cyber-attack scenario.

Cyber security system 200 can be further configured to check if the analysis identified occurrence of the second sub-group B 120-*b* of the respective events (e.g. event A 110-*a*, event B 110-*b*, event C 110-*c*, event D 110-*d*, . . . , event N 110-*n*) and not in negation of the occurrence of the given cyber-attack scenario. In case of the occurrence of the second sub-group B 120-*b* identified continue to block 390. In case the occurrence of the second sub-group B 120-*b* of the respective events (e.g. event A 110-*a*, event B 110-*b*, event C 110-*c*, event D 110-*d*, . . . , event N 110-*n*) and not in negation of the occurrence of the given cyber-attack scenario not identified, return to block 320 and continue the process for the next cyber-attack scenario of the obtained cyber-attack scenarios, if any (block 380).

In continuation of the non-limiting example above, if the analysis determined the occurrence of the running a registry control program on the endpoint than the second sub-group B 120-*b* has been identified and the occurrence of the "execute cyber-attack scenario" has been determined and the process continues to block 390. If the second sub-group B 120-*b* has not been identified or the events identified are in negation of the occurrence of the "execute cyber-attack scenario", then the process returns to block 320.

Cyber security system 200 can be further configured to trigger an alert indicative of a potential occurrence of the given cyber-attack scenario (block 390).

In our non-limiting example, cyber security system 200 has been able to identify the events (a), (b) and (c) associated with the "execute cyber-attack scenario" and thus an alert of a potential occurrence of this scenario is triggered.

It is to be noted that processing circuitry 230 executing the cyber-attack scenario occurrence identification process 300 can be an endpoint processing circuitry of an endpoint of the organization. In these cases, the preliminary information and the complementary information can be collected from the endpoint. It is to be noted that in other cases, the processing circuitry 230 is a central server processing circuitry of a server of the organization. In these cases, the preliminary information and the complementary information can be collected from a plurality of endpoints of the organization. In some cases, the server is a virtual server running in a cloud computing environment.

In some cases, the processing circuitry 230 is a central server processing circuitry of a server of the organization. In these cases, the preliminary information and the complementary information are collected from a SIEM system of the organization. The SIEM monitoring the computational assets and the network elements of the organization.

It is to be noted that, with reference to FIG. 3, some of the blocks can be integrated into a consolidated block or can be broken down to a few blocks and/or other blocks may be added. Furthermore, in some cases, the blocks can be performed in a different order than described. It is to be further noted that some of the blocks are optional (for example: block 390). It should be also noted that whilst the flow diagram is described also with reference to the system elements that realizes them, this is by no means binding, and the blocks can be performed by elements other than those described herein.

FIG. 4 is a flowchart illustrating one example of a sequence of operations carried out for negating an occurrence of a cyber-attack scenario, in accordance with the presently disclosed subject matter.

According to certain examples of the presently disclosed subject matter, cyber security system 200 can be configured to perform a negating an occurrence of a cyber-attack scenario process 400, e.g. utilizing the cyber-attack scenario occurrence identification module 240.

For this purpose, cyber security system 200 can be configured, after performing the 300, to proactively collect additional complementary information, after triggering the alert (block 410). Continuing our non-limiting example above in FIG. 3, the additional complementary information can include information indicative whether software installations have been made on the endpoint.

After proactively collecting additional complementary information, cyber security system 200 can be further configured to analyze the additional complementary information to re-attempt to negate occurrence of the given cyber-attack scenario (block 420).

In some cases, the analysis of the additional complementary information can be based on a pre-defined rule set. In some cases, the rule set is defined by experts. In some cases, the rule set is automatically defined by cyber security system 200. In some cases, the analysis is based on machine-learning.

Continuing our non-limiting example of the "execute cyber-attack scenario", the analysis of the additional complementary information can conclude that a legitimate program has been installed on the endpoint during the time of the occurrence of events (a) and (b). This is an indication that events (a) and (b) are legitimate and are not part of a cyber-attack scenario, thus the "execute cyber-attack scenario" has been negated and the process proceeds to block 430.

Upon the analysis of the complementary information resulting in negation of the occurrence of the given cyber-attack scenario, cyber security system 200 can be further configured to cancel the alert (block 430). In our non-limiting example, the "execute cyber-attack scenario" has been negated by the analysis of the additional complementary information and the alert in our example can be cancelled.

It is to be noted that, with reference to FIG. 4, some of the blocks can be integrated into a consolidated block or can be broken down to a few blocks and/or other blocks may be added. Furthermore, in some cases, the blocks can be performed in a different order than described. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A cyber security system comprising a processing circuitry configured to:
   obtain information of one or more cyber-attack scenarios from one or more of the following sources: cyber-attack simulators, research of cyber-attack scenarios executed on an organization, research of cyber-attack scenarios executed on other organizations, cyber-attack scenarios knowledge bases or known cyber-attack scenarios, each cyber-attack scenario of the obtained cyber-attacked scenarios is: (i) associated with a sequence of a plurality of events, and (ii) posing a threat on one or more computerized systems of the organization;
   for each given cyber-attack scenario of the obtained cyber-attack scenarios:
   (a) collect preliminary information enabling determination of occurrence of a first sub-group of the sequence associated with the given cyber-attack scenario;
   (b) analyze the preliminary information to identify the occurrence of the first sub-group;

(c) upon identification of occurrence of the first sub-group of the respective events, proactively collect complementary information, enabling at least one of: (i) determination of occurrence of a second sub-group of the sequence associated with the given cyber-attack scenario, the second sub-group including at least one of the events of the sequence associated with the given cyber-attack scenario that is not included in the first sub-group, or (ii) determining that the given cyber-attack scenario is not occurring;

(d) analyze the complementary information to perform at least one of: (i) identify the occurrence of the second sub-group, or (ii) attempt to negate occurrence of the given cyber-attack scenario;

(e) upon the analysis of the complementary information resulting in identification of occurrence of the second sub-group of the respective events and not in negation of the occurrence of the given cyber-attack scenario, trigger an alert indicative of a potential occurrence of the given cyber-attack scenario;

(f) proactively collect additional complementary information, after triggering the alert;

(g) analyze the additional complementary information to re-attempt to negate occurrence of the given cyber-attack scenario; and (h) upon the analysis of the complementary information resulting in negation of the occurrence of the given cyber-attack scenario, cancel the alert.

2. The cyber security system of claim 1, wherein the processing circuitry is an endpoint processing circuitry of an endpoint of the organization, and wherein the preliminary information and the complementary information are collected from the endpoint.

3. The cyber security system of claim 1, wherein the processing circuitry is a central server processing circuitry of a server of the organization, and wherein the preliminary information and the complementary information are collected from a plurality of endpoints of the organization.

4. The cyber security system of claim 3, wherein the server is a virtual server running in a cloud computing environment.

5. The cyber security system of claim 1, wherein the preliminary information is received from one or more endpoints of the organization.

6. The cyber security system of claim 1, wherein the processing circuitry is a central server processing circuitry of a server of the organization, and wherein the preliminary information and the complementary information are collected from a Security Information and Event Management (SIEM) system of the organization.

7. The cyber security system of claim 1, wherein the events include one or more of: creation of a first file, creation of a first process, deletion of a second file, termination of a second process, change of a first name of a third file, change of a second name of a third process, loading of a driver, loading of a Dynamic Link Library (DLL), accessing a disk, opening a network connection.

8. The cyber security system of claim 1, wherein at least some of the preliminary information is collected from log files.

9. The cyber security system of claim 1, wherein the complementary information is collected by performing one or more of:

(a) actively scanning a memory of one or more endpoints of the organization;

(b) actively retrieving information from a registry of one or more of the endpoints of the organization; or (c) actively scanning a Master File Table (MFT) of one or more endpoints of the organization.

10. A method comprising:

obtaining, by a processing circuitry, information of one or more cyber-attack scenarios from one or more of the following sources: cyber-attack simulators, research of cyber-attack scenarios executed on an organization, research of cyber-attack scenarios executed on other organizations, cyber-attack scenarios knowledge bases or known cyber-attack scenarios, each cyber-attack scenario of the obtained cyber-attacked scenarios is: (i) associated with a sequence of a plurality of events, and (ii) posing a threat on one or more computerized systems of the organization;

for each given cyber-attack scenario of the obtained cyber-attack scenarios:

(a) collecting, by the processing circuitry, preliminary information enabling determination of occurrence of a first sub-group of the sequence associated with the given cyber-attack scenario;

(b) analyzing, by the processing circuitry, the preliminary information to identify the occurrence of the first sub-group;

(c) upon identification of occurrence of the first sub-group of the respective events, proactively collecting, by the processing circuitry, complementary information, enabling at least one of: (i) determination of occurrence of a second sub-group of the sequence associated with the given cyber-attack scenario, the second sub-group including at least one of the events of the sequence associated with the given cyber-attack scenario that is not included in the first sub-group, or (ii) determining that the given cyber-attack scenario is not occurring;

(d) analyzing, by the processing circuitry, the complementary information to perform at least one of: (i) identify the occurrence of the second sub-group, or (ii) attempt to negate occurrence of the given cyber-attack scenario;

(e) upon the analysis of the complementary information resulting in identification of occurrence of the second sub-group of the respective events and not in negation of the occurrence of the given cyber-attack scenario, triggering, by the processing circuitry, an alert indicative of a potential occurrence of the given cyber-attack scenario;

(f) proactively collecting, by the processing circuitry, additional complementary information, after triggering the alert;

(g) analyzing, by the processing circuitry, the additional complementary information to re-attempt to negate occurrence of the given cyber-attack scenario; and (h) upon the analysis of the complementary information resulting in negation of the occurrence of the given cyber-attack scenario canceling, by the processing circuitry, the alert.

11. The method of claim 10, wherein the processing circuitry is an endpoint processing circuitry of an endpoint of the organization, and wherein the preliminary information and the complementary information are collected from the endpoint.

12. The method of claim 10, wherein the processing circuitry is a central server processing circuitry of a server of the organization, and wherein the preliminary information and the complementary information are collected from a plurality of endpoints of the organization.

13. The method of claim 10, wherein the preliminary information is received from one or more endpoints of the organization.

14. The method of claim 10, wherein the processing circuitry is a central server processing circuitry of a server of the organization, and wherein the preliminary information and the complementary information are collected from a Security Information and Event Management (SIEM) system of the organization.

15. The method of claim 10, wherein the events include one or more of: creation of a first file, creation of a first process, deletion of a second file, termination of a second process, change of a first name of a third file, change of a second name of a third process, loading of a driver, loading of a Dynamic Link Library (DLL), accessing a disk, opening a network connection.

16. The method of claim 10, wherein at least some of the preliminary information is collected from log files.

17. The method of claim 10, wherein the complementary information is collected by performing one or more of:
   (a) actively scanning a memory of one or more endpoints of the organization;
   (b) actively retrieving information from a registry of one or more of the endpoints of the organization; or
   (c) actively scanning a Master File Table (MFT) of one or more endpoints of the organization.

18. A non-transitory computer readable storage medium having computer readable program code embodied therewith, the computer readable program code, executable by at least one processor of a computer to perform a method comprising:
   obtaining, by a processing circuitry, information of one or more cyber-attack scenarios from one or more of the following sources: cyber-attack simulators, research of cyber-attack scenarios executed on an organization, research of cyber-attack scenarios executed on other organizations, cyber-attack scenarios knowledge bases or known cyber-attack scenarios, each cyber-attack scenario of the obtained cyber-attacked scenarios is: (i) associated with a sequence of a plurality of events, and (ii) posing a threat on one or more computerized systems of the organization;
   for each given cyber-attack scenario of the obtained cyber-attack scenarios:
   (a) collecting, by the processing circuitry, preliminary information enabling determination of occurrence of a first sub-group of the sequence associated with the given cyber-attack scenario;
   (b) analyzing, by the processing circuitry, the preliminary information to identify the occurrence of the first sub-group;
   (c) upon identification of occurrence of the first sub-group of the respective events, proactively collecting, by the processing circuitry, complementary information, enabling at least one of: (i) determination of occurrence of a second sub-group of the sequence associated with the given cyber-attack scenario, the second sub-group including at least one of the events of the sequence associated with the given cyber-attack scenario that is not included in the first sub-group, or (ii) determining that the given cyber-attack scenario is not occurring;
   (d) analyzing, by the processing circuitry, the complementary information to perform at least one of: (i) identify the occurrence of the second sub-group, or (ii) attempt to negate occurrence of the given cyber-attack scenario;
   (e) upon the analysis of the complementary information resulting in identification of occurrence of the second sub-group of the respective events and not in negation of the occurrence of the given cyber-attack scenario, triggering, by the processing circuitry, an alert indicative of a potential occurrence of the given cyber-attack scenario;
   (f) proactively collecting, by the processing circuitry, additional complementary information, after triggering the alert;
   (g) analyzing, by the processing circuitry, the additional complementary information to re-attempt to negate occurrence of the given cyber-attack scenario; and
   (h) upon the analysis of the complementary information resulting in negation of the occurrence of the given cyber-attack scenario, canceling, by the processing circuitry, the alert.

* * * * *